(12) United States Patent
Kasazumi et al.

(10) Patent No.: US 11,106,045 B2
(45) Date of Patent: Aug. 31, 2021

(54) DISPLAY SYSTEM, MOVABLE OBJECT, AND DESIGN METHOD

(71) Applicant: Panasonic Intellectual Property Management Co., Ltd., Osaka (JP)

(72) Inventors: Ken'ichi Kasazumi, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/941,136

(22) Filed: Jul. 28, 2020

(65) Prior Publication Data

US 2020/0355930 A1    Nov. 12, 2020

Related U.S. Application Data

(63) Continuation of application No. PCT/JP2019/002834, filed on Jan. 29, 2019.

(30) Foreign Application Priority Data

Jan. 31, 2018    (JP) .............................. JP2018-015926
Mar. 30, 2018    (JP) .............................. JP2018-069723

(51) Int. Cl.
*G02B 27/01*    (2006.01)
*B60K 35/00*    (2006.01)

(52) U.S. Cl.
CPC .......... *G02B 27/0179* (2013.01); *B60K 35/00* (2013.01); *G02B 27/0101* (2013.01);
(Continued)

(58) Field of Classification Search
CPC ............ G02B 27/0179; G02B 27/0101; G02B 27/0149; G02B 2027/0181;
(Continued)

(56) References Cited

U.S. PATENT DOCUMENTS

2009/0160736 A1*  6/2009  Shikita ............... G02B 27/0101
                                                              345/7
2017/0146803 A1*  5/2017  Kishigami ........... H04N 9/3167
(Continued)

FOREIGN PATENT DOCUMENTS

JP    2016-215720    12/2016
WO    2017/010333    1/2017
(Continued)

OTHER PUBLICATIONS

Official Communication issued in International Patent Application No. PCT/JP2019/002834, dated Apr. 23, 2019, along with an English translation thereof.

*Primary Examiner* — Brent D Castiaux
(74) *Attorney, Agent, or Firm* — Greenblum & Bernstein, P.L.C.

(57) ABSTRACT

The display system displays a virtual image as if it is at a target position in a target space. The system satisfies a condition where |1/L1−1/L2max| is larger than 0 but is equal to or smaller than 0.06. L1 [m] denotes a display distance defined as a distance from a point-of-view position for the virtual image to a display position of the virtual image. L2max [m] denotes a maximum value of a target distance defined as a distance from the point-of-view position to the target position.

20 Claims, 5 Drawing Sheets

(52) U.S. Cl.
CPC .......................... *B60K 2370/1529* (2019.05); *G02B 2027/011* (2013.01); *G02B 2027/014* (2013.01); *G02B 2027/0118* (2013.01); *G02B 2027/0147* (2013.01); *G02B 2027/0181* (2013.01); *G02B 2027/0187* (2013.01)

(58) Field of Classification Search
CPC ...... G02B 2027/0147; G02B 2027/011; G02B 2027/0118; G02B 2027/014; G02B 2027/0187; G02B 2027/0154; B60K 25/00; B60K 2370/1529; B60K 2370/177
See application file for complete search history.

(56) References Cited

U.S. PATENT DOCUMENTS

| | | | |
|---|---|---|---|
| 2017/0357088 A1* | 12/2017 | Matsuzaki | ............ B60K 35/00 |
| 2018/0015876 A1 | 1/2018 | Yamagata et al. | |
| 2018/0198955 A1 | 7/2018 | Watanabe | |

FOREIGN PATENT DOCUMENTS

| | | |
|---|---|---|
| WO | 2017/163288 | 9/2017 |
| WO | 2017/163292 | 9/2017 |

\* cited by examiner

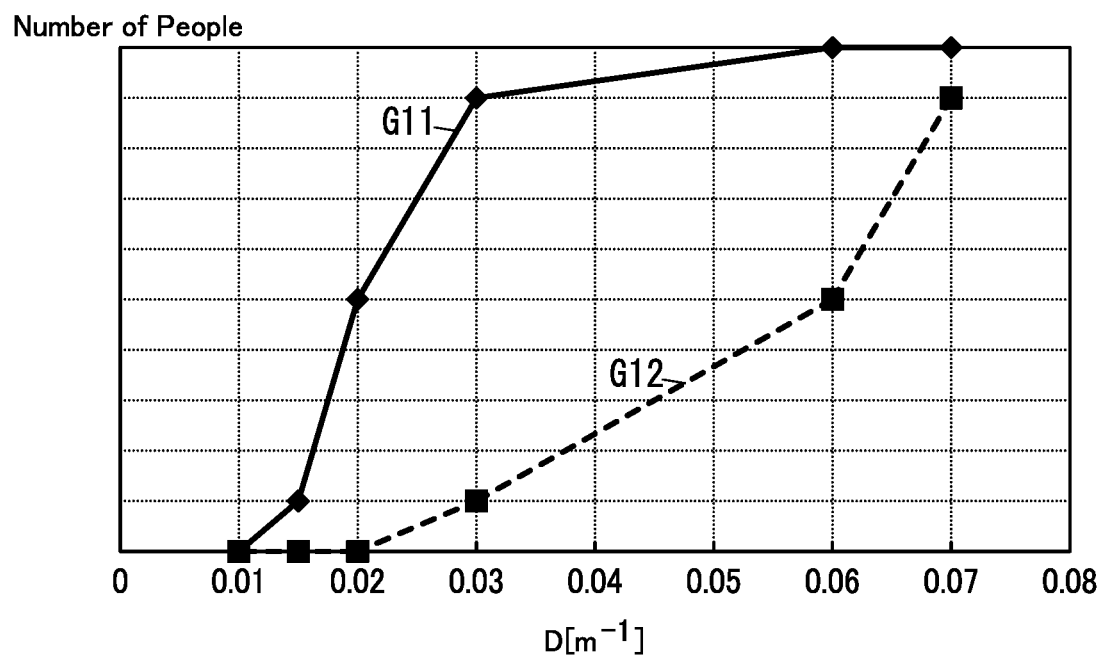

DISPLAY SYSTEM, MOVABLE OBJECT, AND DESIGN METHOD

CROSS-REFERENCE TO RELATED APPLICATION

The present application is a continuation application of International Application PCT/JP2019/002834 filed Jan. 29, 2019, which is based upon and claims the benefit of priority of Japanese Patent Applications No. 2018-015926, filed on Jan. 31, 2018 and No. 2018-069723, filed on Mar. 30, 2018.

TECHNICAL FIELD

The present disclosure generally relates to display systems, movable objects, and design methods, and in particular relates to a display system and a movable object for presenting a virtual image in a target space, and a design method for the display system.

BACKGROUND ART

WO 2017/163292 A1 discloses a head-up display device which projects image light onto a windshield of a vehicle to allow a driver to see a virtual image in front of the windshield. The head-up display device includes a display element, a movable mirror, a movable member, a first mirror, and a second mirror. The movable mirror reflects display light emitted from the display element toward the first mirror. The first mirror reflects display light reflected by the movable mirror toward the second mirror. The second mirror reflects display light reflected by the first mirror and make it converge onto the windshield.

According to WO 2017/163292 A1, moving the movable mirror from a first position close to the first mirror to a second position far from the first mirror is capable of displaying a virtual image at a further position. This teaches that increase in a distance from a point-of-view position for a virtual image to a position where the virtual image overlaps may cause increase in a size of an optical system including mirrors for projecting the virtual image.

An object of the present disclosure would be to propose a display system, a movable object, and a design method which are capable of realizing downsizing while keeping a distance from a point-of-view position for a virtual image to a position where the virtual image overlaps, and additionally reducing distortion of the virtual image.

SUMMARY

A display system according to one aspect of the present disclosure is a display system for displaying a virtual image overlapping with a target position in a target space. The system satisfies a condition where $|1/L1-1/L2max|$ is larger than 0 but is equal to or smaller than 0.06. L1 [m] denotes a display distance defined as a distance from a point-of-view position for the virtual image to a display position of the virtual image. L2max [m] denotes a maximum value of a target distance defined as a distance from the point-of-view position to the target position.

A movable object according to one aspect of the present disclosure includes a movable object body; and the display system according to the above aspect mounted on the movable object body.

A design method according to one aspect of the present disclosure is a design method for a display system for displaying a virtual image overlapping with a target position in a target space and includes a first step and a second step. The first step is a step of determining a display distance defined as a distance from a point-of-view position for the virtual image to a display position of the virtual image. The second step is a step of determining a maximum value of a target distance defined as a distance from the point-of-view position to the target position. L1 [m] denoting the display distance and L2max [m] denoting the maximum value satisfy a condition where $|1/L1-1/L2max|$ is larger than 0 but is equal to or smaller than 0.06.

BIREF DESCRIPTION OF THE DRAWINGS

FIG. 5 shows graphs indicating results of evaluation of display of virtual images.

DETAILED DESCRIPTION

1. Embodiment

1.1 Overview

Figure 1:
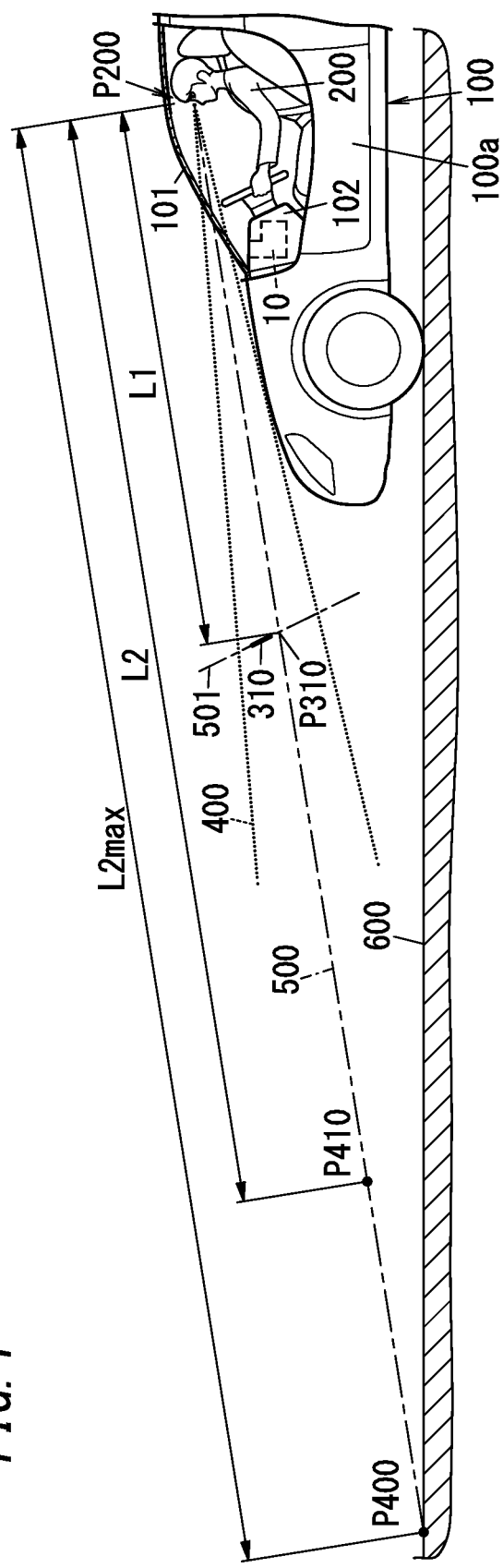
FIG. 1 is a conceptual view of a display system of one embodiment.

FIG. 1 illustrates a display system 10. The display system 10 displays a virtual image 310 overlapping with a target position P410 in a target space 400. The system satisfies a condition where $|1/L1-1/L2max|$ is larger than 0 but is equal to or smaller than 0.06. L1 [m] denotes a display distance defined as a distance from a point-of-view position P200 for the virtual image 310 to a display position P310 of the virtual image 310. L2max [m] denotes a maximum value of a target distance defined as a distance from the point-of-view position P200 to the target position P410.

In the display system 10, the display distance L1 and the maximum value L2max of the target distance satisfy a relation of $0<|1/L1-1/L2max|\leq 0.06$. Therefore, even when the display position P310 of the virtual image 310 is made closer to the point-of-view position P200 than the target position P410 is, a person looking at the target space 400 from the point-of-view position P200 is likely to perceive that the virtual image 310 is in the target position P410. Accordingly, there is no need to extend the display distance L1 of the virtual image 310 for the purpose of increasing a maximum value of the target distance. Thus, it is possible to suppress increase in sizes of optical members for display of the virtual image 310 (in the present embodiment, a first optical member 121 and a second optical member 122) due to extension of the display distance L1 of the virtual image 310. Additionally, such increase in sizes of these optical members may cause distortion of the virtual image 310. Consequently, the present embodiment is capable of realizing downsizing while keeping a distance (the maximum value L2max) from the point-of-view position P200 for the virtual image 310 to a position (the target position P410) where the virtual image 310 overlaps, and additionally reducing distortion of the virtual image 310.

1.2 Configuration

Figure 2:
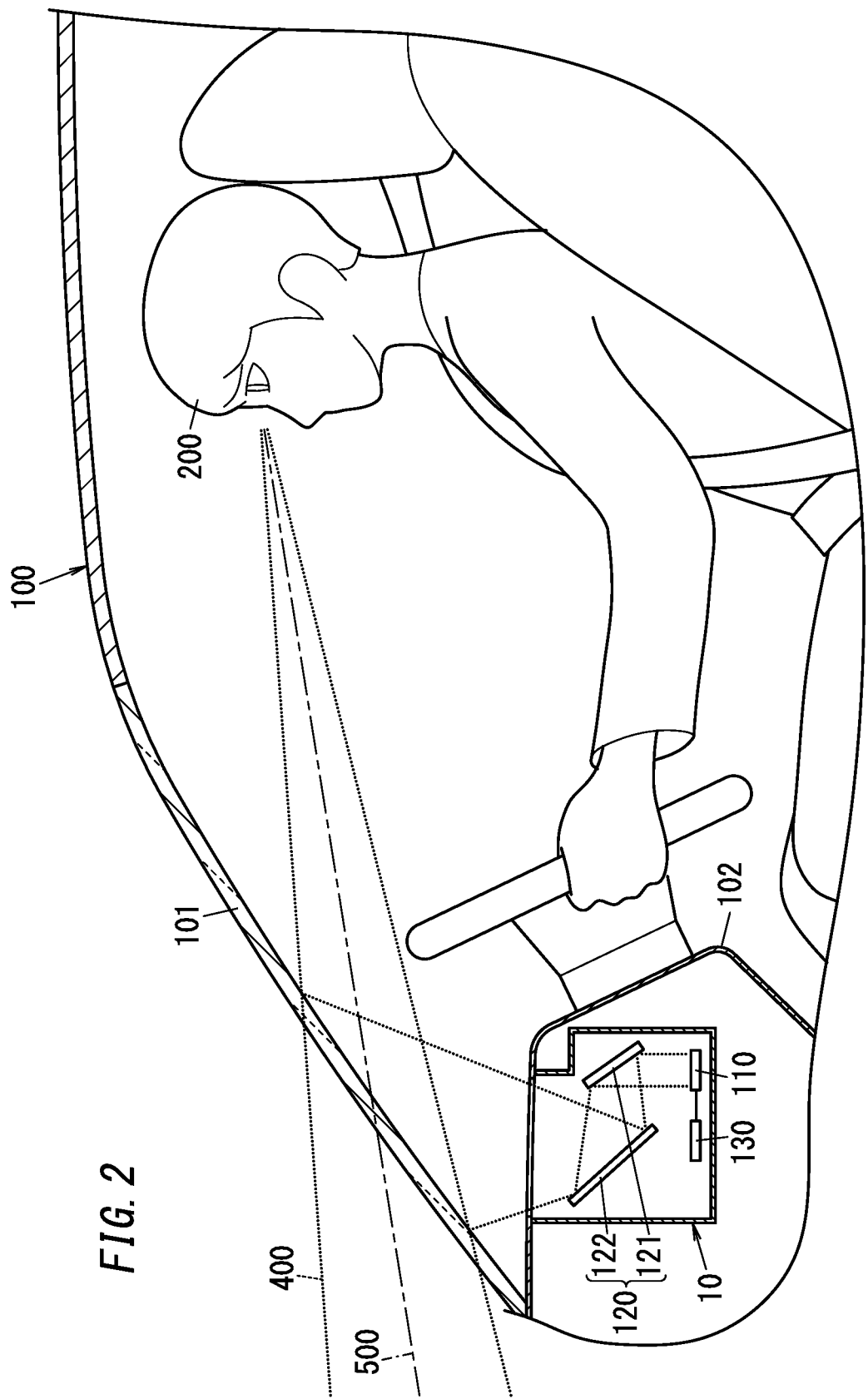
FIG. 2 is a conceptual view of a movable object (automobile) including the display system.

FIG. 1 and FIG. 2 show an automobile 100 serving as a movable object. The automobile 100 includes an automotive body 100a serving as a movable object body, and the display system 10 mounted on the automotive body 100a. The display system 10 is used as a head-up display (HUD) in the automobile 100. Especially, the display system 10 can function as an augmented reality (AR) HUD. Therefore, the display system 10 displays the virtual image 310 so that the virtual image 310 overlaps a scene in front of a field of view of a user 200, by use of augmented reality (AR) technique.

The display system 10 is installed in a cabin of the automobile 100 to be allowed to project from below an image onto a windshield 101 of the automotive body (movable object body) 100a of the automobile 100. In the example shown in FIG. 2, the display system 10 is placed inside a dashboard 102 below the windshield 101. When an image is projected from the display system 10 onto the windshield 101, the image reflected by the windshield 101 serving as a reflective member can be visually perceived by the user 200 (i.e., a driver).

Figure 3:
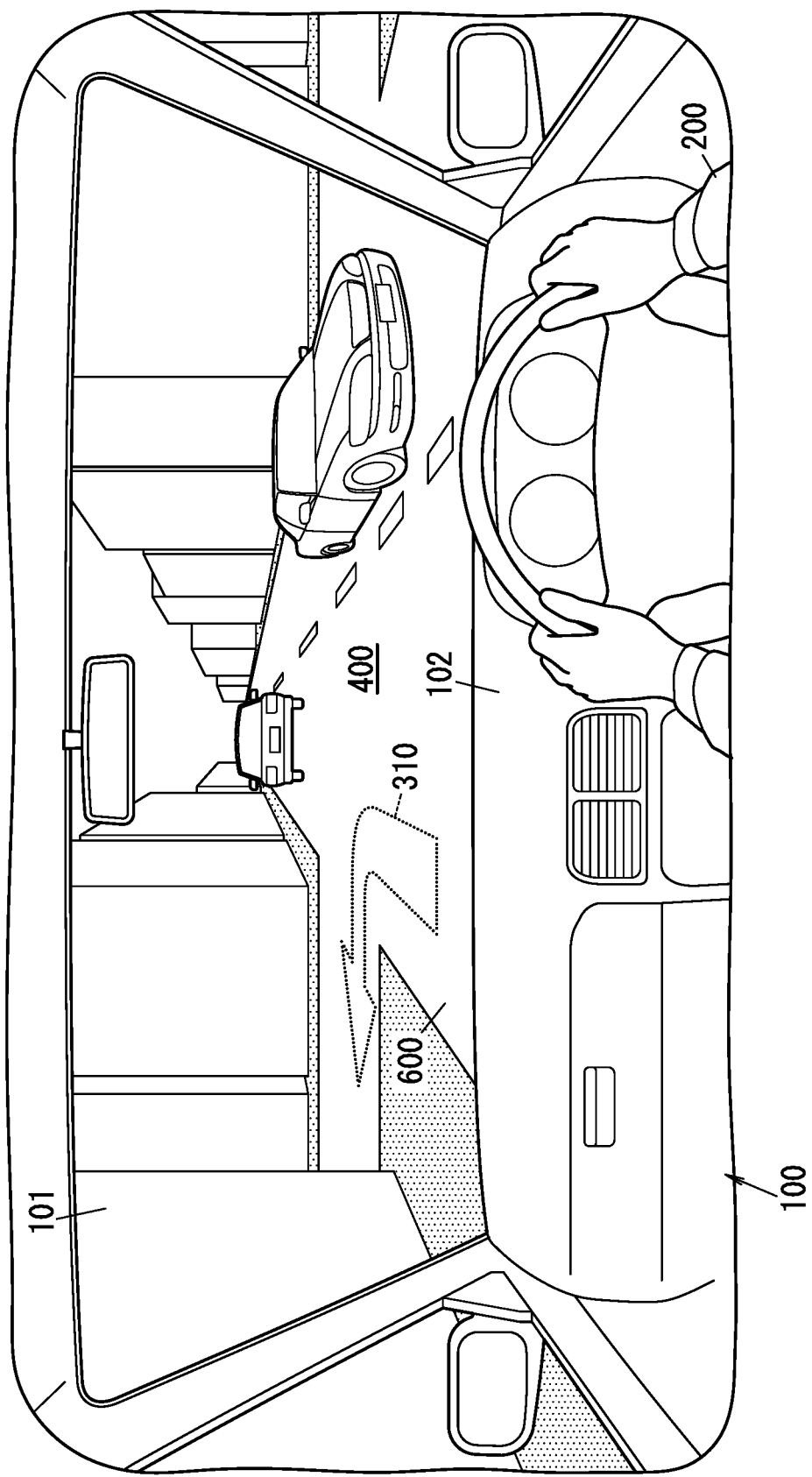
FIG. 3 is a conceptual view of a field of view of a user using the display system.

The display system 10 allows the user 200 to visually perceive the virtual image 310 formed in the target space 400 positioned in front of (outside) the automobile 100 over the windshield 101. In this disclosure, a "virtual image" means an image which is formed by diffused rays of light caused when light emitted from the display system 10 is diffused by a reflective member such as the windshield 101 and appears as if a real object. Therefore, as shown in FIG. 3, the user 200 driving the automobile 100 can see the virtual image 310 which is formed or presented by the display system 10 and is overlaid on a real space spreading in front of the automobile 100. Accordingly, the display system 10 can display the virtual image 310 indicating various driving assist information such as vehicle speed information, navigation information, pedestrian information, forward vehicle information, lane departure information, and vehicle condition information, and can allow the user 200 to visually perceive it. In FIG. 3, the virtual image 310 indicates navigation information exemplified by an arrow for left turn. Accordingly, when the user 200 trains his or her eyes on a space in front of the windshield 101, the user 200 can visually obtain the driving assist information by slight movement of a line of his or her sight.

In the display system 10, the virtual image 310 created in the target space 400 is present within an imaginary plane 501 across an optical axis 500 of the display system 10. In the present embodiment, the optical axis 500 extends along a road surface 600 in front of the automobile 100 in the target space 400 in front of the automobile 100. And, the imaginary plane 501 where the virtual image 310 is inclined relative to the optical axis 500. An angle of the imaginary plane 501 to the optical axis 500 may not be limited particularly. Alternatively, the imaginary plane 501 may not be necessarily inclined relative to the optical axis 500 but may be perpendicular to it.

Hereinafter, detailed description is given to the display system 10. As shown in FIG. 2, the display system 10 includes a display unit 110, a projection unit 120, and a control unit 130.

The display unit 110 is used to display an image to be presented in the target space 400 as the virtual image 310. The display unit 110 includes a display screen where an image to be presented in the target space 400 as the virtual image 310 is displayed. In summary, the image displayed on the display screen of the display unit 110 is an image as a base of the virtual image 310, and may be referred to as a base image if necessary. In the present embodiment, the display screen is a rectangular region in one surface of the display unit 110. In the present embodiment, the display unit 110 is a liquid crystal display.

The projection unit 120 is used for presenting the virtual image 310 corresponding to a base image (an image displayed on the display screen of the display unit 110) in the target space 400. As shown in FIG. 2, the projection unit 120 includes a first optical member 121 and a second optical member 122. In other words, the projection unit 120 is an optical system constituted by the first optical member 121 and the second optical member 122. The first optical member 121 reflects light from the display unit 110 (rays of light constituting the image displayed on the display screen) toward the second optical member 122. The second optical member 122 reflects light from the first optical member 121 toward the windshield 101 (see FIG. 2). Accordingly, the projection unit 120 projects the image formed on the display screen of the display unit 110 onto the windshield 101, thereby presenting the virtual image 310 in the target space 400.

In the display system 10, the display distance L1 [m] which is a distance from the point-of-view position P200 of the virtual image 310 to the display position P310 of the virtual image 310 is determined by the design of the projection unit 120. The point-of-view position P200 is a center position of a visually perceptible area of the virtual image 310 (so-called, an eye-box). Note that, in the present embodiment, positions of the first optical member 121 and the second optical member 122 of the projection unit 120 are fixed. In other words, the projection unit 120 does not have a function of adjusting the display distance L1 and the display distance L1 has a fixed value. Further, in the display system 10, a displayable area 300 (see FIG. 4) of the virtual image 310 is determined by a size of the display screen of the display unit 110 and designs of the first optical member 121 and the second optical member 122 of the projection unit 120. In the present embodiment, there is no need to set the display distance L1 to the maximum value L2max of the target distance L2. Therefore, in contras to a case where the display distance L1 is set to the maximum value L2max of the target distance L2, the optical system for displaying the virtual image 310 (that is, the projection unit 120) can be downsized. Further, as the virtual image 310 comes closer to the point-of-view position P200, distortion can be reduced. Consequently, distortion of the virtual image 310 due to the optical system can be reduced.

the control unit 130 is an electric circuit configured to control operation of the display system 10. Especially, the control unit 130 is configured to control the display unit 110. The control unit 130 provides an image signal to the display unit 110 to form an image on the display screen of the display unit 110. The control unit 130 can be constituted by one or moe processors (microprocessors) and one or more memories. In other words, the one or more processors execute one or more programs stored in the one or more memories, thereby functioning as the control unit 130. The one or more programs may be stored in the one or more memories in advance, provided through telecommunication circuits such as the Internet, or recorded in a non-transitory recoding medium such as a memory card and provided.

The control unit 130 has a function of performing a process (virtual image display process) of controlling the display unit 110 to display the virtual image 310 overlapping the target position P410 in the target space 400. Displaying the virtual image 310 overlapping the target position P410 in the target space 400 means visually presenting the virtual image 310 as if it exists at the target position P410. In summary, the control unit 130 performs the virtual image display process to visually present the virtual image 310 at the display position P310 as if it exits at the target position P410 in a real space. For example, the virtual image 310 existing at the display position P310 can be visually perceived by the user 200 looking at the target space 400 from the point-of-view position P200 as if the virtual image 310 is a target object 410 existing at the target position P410 (see FIG. 3 and FIG. 4).

The control unit 130 starts the virtual image display process when it is given a display instruction of the virtual image 310 from an external device. The display instruction includes positional information and type information of the virtual image 310. The positional information of the virtual image 310 may include information regarding the target position P410. The information regarding the target position P410 may include information regarding a three-dimensional position of the target position P410 in the target space 400. Examples of the type information of the virtual image 310 may include various types of driving assist information such as various driving assist information such as vehicle speed information, navigation information, pedestrian information, forward vehicle information, lane departure information, and vehicle condition information. Examples of the external device may include an engine control unit of the automobile 100 and a navigation system.

Figure 4:
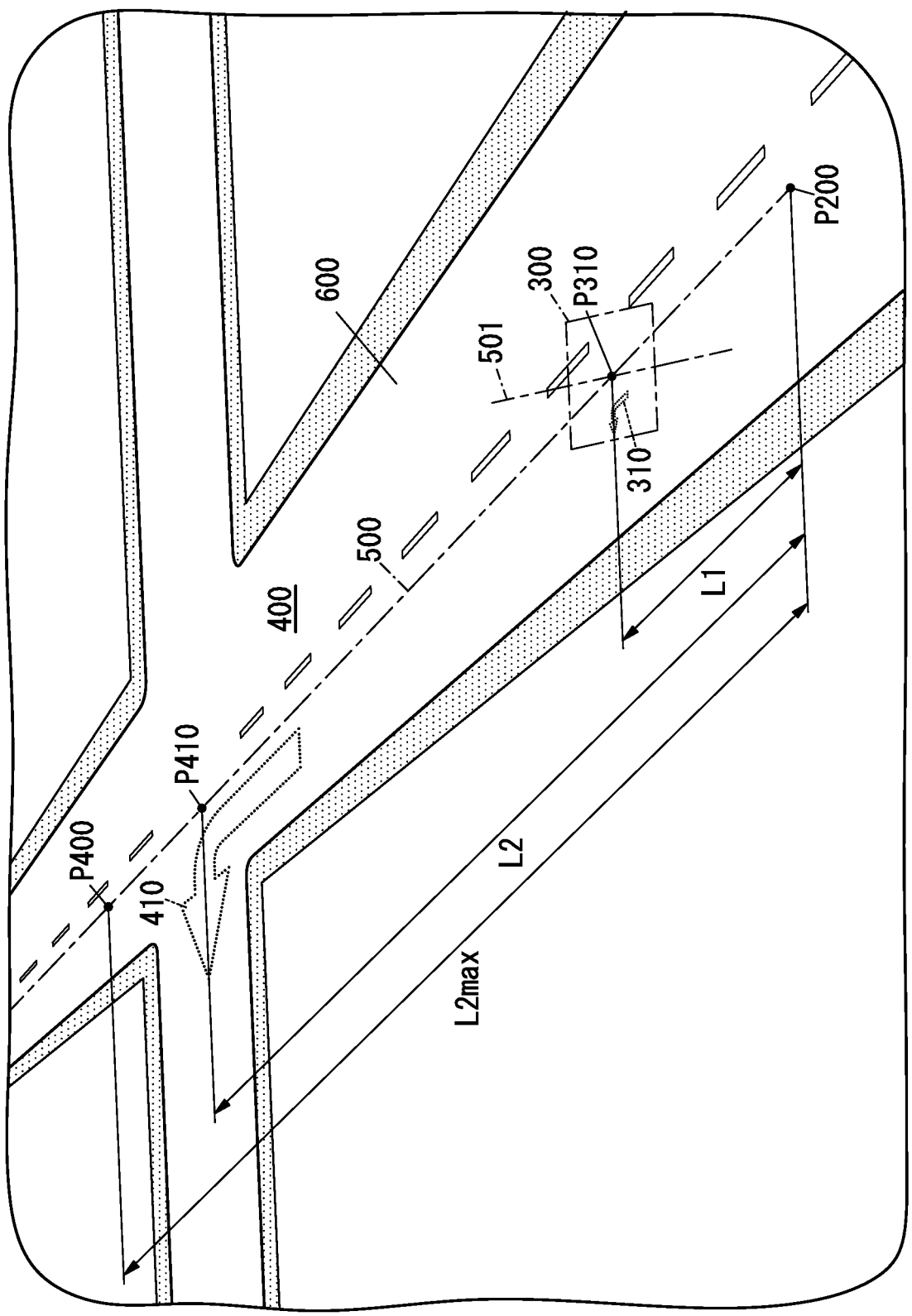
FIG. 4 is an explanatory view of the display system.

In the display system 10, the maximum value L2max [m] of the target distance L2 [m] which is a distance from the point-of-view position P200 of the virtual image 310 to the target position P410 is set (see FIG. 1 and FIG. 4). In other words, the maximum value L2max of the target distance L2 is a distance between the point-of-view position P200 and the target position P410 located in the furthest position from the point-of-view position P200. In the present embodiment, the control unit 130 does not display the virtual image 310 so that it overlaps the target position P410 when the target distance L2 exceeds the maximum value L2max.

The maximum value L2max of the target distance L2 is determined based on a result of a virtual image display evaluation. The virtual image display evaluation was made based on the number of people who felt something wrong in the virtual image 310 and its vicinity from the point-of-view position P200 and the number of people who misrecognized a distance to the virtual image 310 in a situation where the display position P310 of the virtual image 310 was made to be closer to the point-of-view position P200 than the target position P410 was.

FIG. 5 illustrates part of the result of the virtual image display evaluation. In FIG. 5, a vertical axis denotes the number of people, and a horizontal axis denotes a parameter D decided by the display distance L1 and the target distance L2. The parameter D is given by $|1/L1-1/L2|$. Units of L1 and L2 are [m]. Therefore, a unit of the parameter D is [1/m]. Hereinafter, this parameter is referred to as a "diopter". In FIG. 5, a graph G11 represents the number of people who look at the virtual image 310 and its vicinity from the point-of-view position P200 and feel something wrong therein when the virtual image 310 is displayed to overlap with a target position P210. A graph G12 represents the number of people who look at the virtual image 310 and its vicinity from the point-of-view position P200 and misrecognize a distance to the virtual image 310 when the virtual image 310 is displayed to overlap with the target position P210.

According to the result of the virtual image display evaluation, it is confirmed that a half or more of people who look at the target space 400 from the point-of-view position P200 recognize that the virtual image 310 is in the target position P410 as long as the diopter D is equal to or smaller than 0.06 even when there is a difference between the display position P310 of the virtual image 310 and the target position P410. Further, when the diopter D is equal to or smaller than 0.03, most of the people who look at the target space 400 from the point-of-view position P200 recognize that the virtual image 310 is in the target position P410 even when there is a difference between the display position P310 of the virtual image 310 and the target position P410. Further, when the diopter D is equal to or smaller than 0.02, a half or more of the people who look at the target space 400 from the point-of-view position P200 can visually perceive the virtual image 310 and its vicinity without feeling something wrong even when there is a difference between the display position P310 of the virtual image 310 and the target position P410. Further, when the diopter D is equal to or smaller than 0.015, most of the people who look at the target space 400 from the point-of-view position P200 can visually perceive the virtual image 310 and its vicinity without feeling something wrong even when there is a difference between the display position P310 of the virtual image 310 and the target position P410. Further, when the diopter D is equal to or smaller than 0.01, nearly all of the people who look at the target space 400 from the point-of-view position P200 can visually perceive the virtual image 310 and its vicinity without feeling something wrong even when there is a difference between the display position P310 of the virtual image 310 and the target position P410.

In the present embodiment, the display distance L1 and the maximum value L2max of the target distance L2 are determined to allow $|1/L1 -1/L2max|$ to be larger than 0 but is equal to or smaller than 0.06. In one example, the display distance L1 is 15 [m] and the maximum value L2max is 100 [m].

In the virtual image display process, the control unit 130 displays the base image on the display screen of the display unit 110 so that the virtual image 310 looks as if it overlaps the target position P410 in the target space 400. The control unit 130 determines the base image in accordance with the type information of the virtual image 310 included in the display instruction. The control unit 130 determines a reference position of the base image within the display screen of the display unit 110 in accordance with the positional information of the virtual image 310 (the information regarding the target position P410) included in the display instruction.

Further, the control unit 130 modifies the base image based on rules of perspective depending on the display position P310 of the virtual image 310 and the target position P410. In the example shown in FIG. 4, the control unit 130 adjusts appearance of the virtual image 310 to allow the target object 410 to look as if it exists at the target position P410. In this case, the control unit 130 determines an angle of depression of the target position P410, a depth of the target position P410, and a positional relationship between the display position P310 and the target position P410, from the display position P310 and the target position P410. The angle of depression of the target position P410 corresponds to a viewing angle of the target position P410 from the user 200. The depth of the target position P410 corresponds to an area of the target position P410 where the virtual image 310 overlaps. The positional relationship between the display position P310 and the target position P410 may include a distance between the display distance L1 and the target distance L2 and a position relationship between the target object 410 to be presented by the virtual image 310 and an object between the target object 410 and the point-of-view position P200, for example. The control unit 130 adjusts at least one of a shape and a size of the base image based on the angle of depression, the depth, and the positional relationship. For example, the control unit 130 adjusts a perspective (a degree of inclination and a degree of extension) of the base image in accordance with the angle of depression and the depth. The control unit 130 adjusts a dimension in a depth direction of the base image in accordance with the depth. The control unit 130 reduces or increases a size of the base image in accordance with the positional relationship between the display distance L1 and the target distance L2. When part of the target object 410 is hidden and then not visible from the point-of-view position P200, the control unit 130 makes the base image to lack partially.

The control unit 130 is configured to make change in a display method for an image (base image) in accordance with the parameter D determined by the display position P310 and the target position P410. The parameter D is the diopter mentioned before and given by |1/L1−1/L2|. In the present embodiment, the control unit 130 does not change the display method for the base image while the diopter D is equal to or smaller than a threshold value. Meanwhile, the control unit 130 makes change in the display method for the base image when the diopter D exceeds the threshold value. The threshold value is, in the present embodiment, 0.03. Note that, the threshold value is smaller than |1/L1−1/L2max|.

Change in the display method may be done based on sensitivity to stereopsis (perception of layout). The sensitivity to stereopsis is an index of whether an observer can perceive a depth relation between two objects away from the observer (see: James E. Cutting, "Perception of Space and Motion", Academic Press, 1995). Sources of information affecting on the sensitivity to stereopsis include a "relative density", a "relative size", "occlusions", "accommodation", "convergence", a "binocular disparity", a "motion perspective", a "height in visual field", and an "aerial perspective". The "occlusions" mean a situation where one of two objects is hidden by the other. Affects on the sensitivities to stereopsis corresponding to the "relative density", the "relative size", and the "occlusions" are constant irrespective of an average distance between two objects away from an observer, and the affect on the sensitivity to stereopsis becomes higher in the order of the "relative density", the "relative size", and the "occlusions". Affects on the sensitivity to stereopsis corresponding to the "accommodation" and the "convergence" are effective within a range of the average distance from about 0 to 10 m and decrease with increase in the average distance. Affects on the sensitivity to stereopsis corresponding to the "binocular disparity" and the "motion perspective" are effective within a range of the average distance from about 0 to 1000 m. The affect on the sensitivity to stereopsis corresponding to the "binocular disparity" decreases with increase in the average distance. The affect on the sensitivity to stereopsis corresponding to the "motion perspective" first increases and then decreases with increase in the average distance, and has a peak within a range of the average distance from about 1 to 2 m. An affect on the sensitivity to stereopsis corresponding to the "height in visual field" is effective within a range of the average distance from about 2 to 5000 m and decreases with increase in the average distance. An affect on the sensitivity to stereopsis corresponding to the "aerial perspective" is effective within a range of the average distance from about 50 to 5000 m, and it first increases and then decreases with increase in the average distance, and it has a peak within a region near about 5000 m. Examples of the change in the display method based on such sensitivity to stereopsis may include changes in luminance, resolution, contrast, chroma, and texture density of the base image. Additional examples of the change in the display method may include emphasis of the angle of depression of the base image, emphasis of the perspective of the base image, and emphasis of change in size of the base image. As described above, by changing the display method for the base image in accordance with the diopter D, it is possible to further reduce strange feeling which a person looking at the virtual image 310 from the point-of-view position P200 has. Especially, by making change in the display method for the base image based on the sensitivity to stereopsis, it is possible to further reduce strange feeling which a person looking at the virtual image 310 from the point-of-view position P200 has. In one example of a concrete method for changing the display method, when the display position P310 is further from the point-of-view position P200 than the target position P410 is, it is effective to increase the luminance, the resolution, the contrast, and the chroma of the base image, decrease the texture density of the base image, reduce the angle of depression of the base image, and emphasize increase in size of the base image. In contrast, when the display position P310 is closer to the point-of-view position P200 than the target position P410 is, it is effective to decrease the luminance, the resolution, the contrast, and the chroma of the base image, increase the texture density of the base image, increase the angle of depression of the base image, and emphasize decrease in size of the base image. As described above, the change in the display method may include at least one of: change in luminance of the base image, change in resolution of the base image, change in contrast of the base image, change in chroma of the base image, change in texture density of the base image, emphasis of an angle of depression of the base image, emphasis of a perspective of the base image, and emphasis of change in size of the base image. The control unit 130 may be configured to, when the display position P310 is further from the point-of-view position P200 than the target position P410 is, perform at least one of increase in the luminance of the base image, increase in the resolution of the base image, increase in the contrast of the base image, increase in the chroma of the base image, decrease in the texture density of the base image, decrease in the angle of depression of the base image, and emphasis for increase in size of the base image. The control unit 130 may be configured to, when the display position P310 is closer to the point-of-view position P200 than the target position P410 is, perform at least one of decrease in the luminance of the base image, decrease in the resolution of the base image, decrease in the contrast of the base image, decrease in the chroma of the base image, increase in the texture density of the base image, increase in the angle of depression of the base image, and emphasis for decrease in size of the base image. When the display position P310 is in a distant region (i.e., upper part of a field of view of the user 200), it is effective to draw parallel lines in perspective in the base image and change a degree of convergence of the parallel lines in a far region in the base image. Examples of the parallel lines may include lines arranged in a horizontal direction or a vertical direction in the base image. The far region is a region which belongs to the base image and corresponds to the upper part of the field of view of the user 200. Concretely, when the display position P310 is closer to the point-of-view position P200 than the target position P410 is, it is preferable to make the degree of the convergence of the parallel lines larger than a standard value of the convergence in the far region. When the display position P310 is further from the point-of-view position P200 than the target position P410 is, it is preferable to make the degree of the convergence of the parallel lines smaller than the standard value of the convergence in the far region. The standard value of the convergence may be a degree of the convergence of the parallel lines while the display position P310 and the target position P410 are in the same position relative to the point-of-view position P200, for example. When the display position P310 is in a near region (i.e., lower part of the field of view of the user 200), it is effective to draw parallel lines in perspective in the base image and change a degree of divergence of the parallel lines in a close region in the base image. The close region is a region which belongs to the base image and corresponds to the lower part of the field of view of the user 200. Concretely, when the display position P310 is closer to the point-of-view position P200 than the target position P410 is, it is preferable to make the degree of the divergence of the parallel lines smaller than a standard value of the divergence in the close region. When the display position P310 is further from the point-of-view position P200 than the target position P410 is, it is preferable to make the degree of the divergence of the parallel lines larger than the standard value of the divergence in the close region. The standard value of the divergence may be a degree of the divergence of the parallel lines while the display position P310 and the target position P410 are in the same position relative to the point-of-view position P200, for example. As to these changes or emphases in the display method, it is preferable to use preferentially a display method relating to a source of information highly affecting on the sensitivity to stereopsis. It is preferable to change the display method in a stepwise manner in accordance with degrees of affects of sources of information relating to the individual display methods.

1.3 Design Method

According to the display system 10 of the present embodiment, it is possible to realize downsizing while keeping the distance (the maximum value L2max) from the point-of-view position P200 for the virtual image 310 to the position where the virtual image 310 overlaps (the target position P410), and additionally reduce distortion of the virtual image 310. The display system 10 can be manufactured by a manufacture method including a design method described below. In other words, the display system 10 is designed by the following design method. The design method is a design method for the display system 10 for displaying the virtual image 310 overlapping with the target position P410 in the target space 400 and includes a first step and a second step. The first step is a step of determining the display distance defined as the distance from the point-of-view position P200 for the virtual image 310 to the display position P310 of the virtual image 310. The second step is a step of determining the maximum value of the target distance defined as the distance from the point-of-view position P200 to the target position P410. L1 [m] denoting the display distance and L2max [m] denoting the maximum value satisfy a condition where $|1/L1-1/L2max|$ is larger than 0 but is equal to or smaller than 0.06. According to this display method, it is possible to design the display system 10 capable of realizing downsizing while keeping the distance (the maximum value L2max) from the point-of-view position P200 for the virtual image 310 to the position where the virtual image 310 overlaps (the target position P410), and additionally reducing distortion of the virtual image 310. Note that, in the above design method, the order of the first step and the second step is not limited particularly. In summary, the maximum value L2max may be determined first and then the display distance L1 may be determined, and vice versa.

2. Variations

Embodiments of the present disclosure are not limited to the above embodiment. The above embodiment may be modified in various ways in accordance with design or the like as it can achieve the object of the present disclosure. Hereinafter, variations of the above embodiment are listed.

In the above embodiment, $|1/L1-1/L2max|$ is lager than 0 but is equal to or smaller than 0.06. However, an upper limit of $|1/L1-1/L2max|$ may be larger than 0 but smaller than 0.06. For example, $|1/L1-1/L2max|$ may be equal to or smaller than 0.03. In this case, the display distance L1 may be 25 [m] and the maximum value L2max may be 100 [m]. $|1/L1-1/L2max|$ may be equal to or smaller than 0.02. In this case, the display distance L1 may be 33 [m] and the maximum value L2max may be 100 [m]. $|1/L1-1/L2max|$ may be equal to or smaller than 0.015. In this case, the display distance L1 may be 40 [m] and the maximum value L2max may be 100 [m]. $|1/L1-1/L2max|$ may be equal to or smaller than 0.01. In this case, the display distance L1 may be 50 [m] and the maximum value L2max may be 100 [m].

The above embodiment shows an example where the display position P310 is closer to the point-of-view position P200 than the target position P410 is. However, even in a case where the target position P410 is closer to the point-of-view position P200 than the display position P310 is, the same effects as the above embodiment can be obtained.

In the above embodiment, the threshold value is 0.03. However, the threshold value may be larger than 0 but is smaller than $|1/L1-1/L2max|$. For example, the threshold value may be 0.02. The threshold value may be 0.015. The threshold value may be 0.01. Two or more threshold values may be used. The display method may be changed based on which one of threshold values $|1/L1-1/L2|$ exceeds. For example, the threshold values may include three values of 0.01, 0.02, 0.03. The threshold values may include two threshold values which are a first threshold value (e.g., 0.01) and a second threshold value (e.g., 0.03) larger than the first threshold value. The control unit 130 may not make change in the display method based on the sensitivity to stereopsis while the parameter ($|1/L1-1/L2|$) is equal to or smaller than the first threshold value (0.01). The control unit 130 may apply different display methods based on the sensitivity to stereopsis for a case in which the parameter ($|1/L1-1/L2|$) exceeds the first threshold value but is equal to or smaller than the second threshold value and a case in which the parameter exceeds the second threshold value. In more detail, when the parameter ($|1/L1-1/L2|$) exceeds the first threshold value (0.01), the control unit 130 may make change in the display method based on the sensitivity to stereopsis to decrease probability that a person looking at the target space 400 from the point-of-view position P200 feels something wrong in the virtual image 310 and its vicinity. When the parameter ($|1/L1-1/L2|$) exceeds the second threshold value (0.03), the control unit 130 may make change in the display method based on the sensitivity to stereopsis to increase probability that a person looking at the target space 400 from the point-of-view position P200 perceives that the virtual image 310 is in the target position P410.

The control unit 130 may not necessarily make change in the display method for the base image.

For example, when $|1/L1-1/L2max|$ is equal to or smaller than 0.015, in many cases no problem occurs even when change in the display method based on the sensitivity to stereopsis is not made.

In the above embodiment, the control unit 130 adjusts at least one of the shape and the size of the base image in accordance with the target distance L2 obtained from the information regarding the target position P410. However, this configuration is optional.

The display unit 110 may not be limited to a liquid crystal display. For example, the display unit 110 may be an image display device other than a liquid crystal display, such as an organic EL display. The display unit 110 may not be an image display device as such. For example, the display unit 110 may be a system including a projector and a screen onto which an image is projected from the projector, or a system including a laser scanning device and a screen on which an image is formed by laser scanning by the laser scanning device. The display unit 110 may be a screen as such or a plane mirror for reflecting an image from an image display device. In summary, the display unit 110 may display an intermediate image.

The projection unit 120 may have a function of adjusting the display distance L1. In summary, the projection unit 120 may have a function of moving the imaginary plane 501 along the optical axis 500. In one example, such a function can be realized by making positions of the first optical member 121 and the second optical member 122 of the projection unit 120 changeable and existing various techniques are available (see WO 2017/163292 A1). Regarding the projection unit 120, shapes of the first optical member 121 and the second optical member 122 can be changed. The display distance L1 is also adjustable by changing a length of a light path from the display unit 110 to the point-of-view position P200.

For example, the display system 10 may not be limited to a configuration of forming the virtual image 310 in the target space 400 set in front of the automobile 100 in relation to a moving direction thereof. However, the display system 10 may form the virtual image 310 beside, behind, or over the automobile 100 in relation to the moving direction thereof, for example. The projection unit 120 may include a relay optical system for forming an intermediate image but may not include such a relay optical system.

For example, the display system 10 may apply to not only a head-up display used in the automobile 100 but also a movable object other than the automobile 100, such as a bicycle, a train, an aircraft, a construction machine, a boat and a ship. The display system 10 may not be limited to being used in movable objects but may be used in amusement facilities.

3. Aspects

As obviously understood from the embodiments and variations, the present disclosure contains the following first to fifteenth aspects. In the following, the reference signs in parentheses are introduced in order to clearly indicate relation between the aspects and the embodiment and variations.

A display system (10) according to a first aspect is a display system for displaying a virtual image (310) overlapping with a target position (P410) in a target space (400). The system satisfies a condition where $|1/L1-1/L2max|$ is larger than 0 but is equal to or smaller than 0.06 wherein L1 [m] denotes a display distance defined as a distance from a point-of-view position (P200) for the virtual image (310) to a display position (P310) of the virtual image (310), and L2max [m] denotes a maximum value of a target distance defined as a distance from the point-of-view position (P200) to the target position (P410). According to the first aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a second aspect would be realized in combination with the first aspect. In the second aspect, $|1/L1-1/L2max|$ is equal to or smaller than 0.03. According to the second aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a third aspect would be realized in combination with the first or second aspect. In the third aspect, $|1/L1-1/L2max|$ is equal to or smaller than 0.02. According to the third aspect, it is possible to realize further downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a fourth aspect would be realized in combination with any one of the first to third aspects. In the fourth aspect, $|1/L1-1/L2max|$ is equal to or smaller than 0.015. According to the fourth aspect, it is possible to realize further downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a fifth aspect would be realized in combination with any one of the first to fourth aspects. In the fifth aspect, $|1/L1-1/L2max|$ is equal to or smaller than 0.01. According to the fifth aspect, it is possible to realize further downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a sixth aspect would be realized in combination with any one of the first to fifth aspects. In the sixth aspect, L2max is 100 [m]. According to the sixth aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to a seventh aspect would be realized in combination with the sixth aspect. In the seventh aspect, L1 is in a range of 25 to 50 [m]. According to the seventh aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

A display system (10) according to an eighth aspect would be realized in combination with any one of the first to seventh aspects. In the eighth aspect, the display system (10) includes: a display unit (110) configured to display an image; a projection unit (120) configured to project the virtual image (310) corresponding to the image into the target space (400); and a control unit (130) configured to control the display unit (110). The control unit (130) is configured to change a display method for the image in accordance with a parameter determined based on the display position (P310) and the target position (P410). The parameter is given by $|1/L1-1/L2|$, L2 [m] denoting the target distance. According to the eighth aspect, it is possible to reduce strange feeling which a person looking at the virtual image (310) from the point-of-view position (P200) has.

A display system (10) according to a ninth aspect would be realized in combination with the eighth aspect. In the ninth aspect, the control unit (130) is configured to change the display method for the image based on sensitivity to stereopsis when the parameter exceeds a threshold value. According to the ninth aspect, it is possible to further reduce strange feeling which a person looking at the virtual image (310) from the point-of-view position (P200) has.

A display system (10) according to a tenth aspect would be realized in combination with the ninth aspect. In the tenth aspect, the control unit (130) is configured not to change the display method for the image while the parameter is equal to or smaller than the threshold value. According to the tenth aspect, it is possible to further reduce strange feeling which a person looking at the virtual image (310) from the point-of-view position (P200) has.

A display system (10) according to an eleventh aspect would be realized in combination with the ninth or tenth aspect. In the eleventh aspect, the threshold value defines a first threshold value. The control unit (130) is configured to apply different display methods based on the sensitivity to stereopsis for a case in which the parameter exceeds the first threshold value but is equal to or smaller than a second threshold value larger than the first threshold value and a case in which the parameter exceeds the second threshold value. According to the eleventh aspect, it is possible to further reduce strange feeling which a person looking at the virtual image (310) from the point-of-view position (P200) has.

A display system (10) according to a twelfth aspect would be realized in combination with the eleventh aspect. In the twelfth aspect, the control unit (130) is configured to, when the parameter exceeds the first threshold value but is equal to or smaller than the second threshold value, make change in the display method based on the sensitivity to stereopsis to decrease probability that a person looking at the target space (400) from the point-of-view position (P200) feels something wrong in the virtual image (310) and its vicinity. According to the twelfth aspect, it is possible to further reduce strange feeling which a person looking at the virtual image (310) from the point-of-view position (P200) has.

A display system (10) according to a thirteenth aspect would be realized in combination with the eleventh or twelfth aspect. In the thirteenth aspect, the control unit (130) is configured to, when the parameter exceeds the second threshold value, make change in the display method based on the sensitivity to stereopsis to increase probability that a person looking at the target space (400) from the point-of-view position (P200) perceives that the virtual image (310) is in the target position (P410). According to the thirteenth aspect, it is possible to further reduce strange feeling which a person looking at the virtual image (310) from the point-of-view position (P200) has.

A display system (10) according to a fourteenth aspect would be realized in combination with any one of the eighth to thirteenth aspects. In the fourteenth aspect, the change in the display method includes at least one of: change in luminance of the base image, change in resolution of the base image, change in contrast of the base image, change in chroma of the base image, change in texture density of the base image, emphasis of an angle of depression of the base image, emphasis of a perspective of the base image, and emphasis of change in size of the base image. According to the fourteenth aspect, it is possible to reduce strange feeling which a person looking at the virtual image (310) from the point-of-view position (P200) has.

A display system (10) according to a fifteenth aspect would be realized in combination with the fourteenth aspect. In the fifteenth aspect, the control unit (130) is configured to, when the display position (P310) is further from the point-of-view position (P200) than the target position (P410) is, perform at least one of increase in the luminance of the base image, increase in the resolution of the base image, increase in the contrast of the base image, increase in the chroma of the base image, decrease in the texture density of the base image, decrease in the angle of depression of the base image, and emphasis for increase in size of the base image. According to the fifteenth aspect, it is possible to reduce strange feeling which a person looking at the virtual image (310) from the point-of-view position (P200) has.

A display system (10) according to a sixteenth aspect would be realized in combination with the fourteenth or fifteenth aspect. In the sixteenth aspect, the control unit (130) is configured to, when the display position (P310) is closer to the point-of-view position (P200) than the target position (P410) is, perform at least one of decrease in the luminance of the base image, decrease in the resolution of the base image, decrease in the contrast of the base image, decrease in the chroma of the base image, increase in the texture density of the base image, increase in the angle of depression of the base image, and emphasis for decrease in size of the base image. According to the sixteenth aspect, it is possible to reduce strange feeling which a person looking at the virtual image (310) from the point-of-view position (P200) has.

A display system (10) according to a seventeenth aspect would be realized in combination with any one of the eighth to sixteenth aspects. In the seventeenth aspect, the control unit (130) is configured to, when the display position (P310) is in upper part of a field of view of a user (200), draw parallel lines in perspective in the base image and change a degree of convergence of the parallel lines in a region which belongs to the base image and corresponds to the upper part. According to the seventeenth aspect, it is possible to reduce strange feeling which a person looking at the virtual image (310) from the point-of-view position (P200) has.

A display system (10) according to an eighteenth aspect would be realized in combination with any one of the eighth to seventeenth aspects. In the eighteenth aspect, the control unit (130) is configured to, when the display position (P310) is in lower part of the field of view of a user (200), draw parallel lines in perspective in the base image and change a degree of divergence of the parallel lines in a region which belongs to the base image and corresponds to the lower part. According to the eighteenth aspect, it is possible to reduce strange feeling which a person looking at the virtual image (310) from the point-of-view position (P200) has.

A movable object (100) according to a nineteenth aspect includes: a movable object body (100a); and the display system (10) according to any one of the first to eighteenth aspects mounted on the movable object body (100a). According to the nineteenth aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

A design method according to a twentieth aspect is a design method for a display system (10) for displaying a virtual image (310) overlapping with a target position (P410) in a target space (400) and includes a first step and a second step. The first step is a step of determining a display distance defined as a distance from a point-of-view position (P200) for the virtual image (310) to a display position (P310) of the virtual image (310). The second step is a step of determining a maximum value of a target distance defined as a distance from the point-of-view position (P200) to the target position (P410). L1 [m] denoting the display distance and L2max [m] denoting the maximum value satisfy a condition where $|1/L1-1/L2max|$ is larger than 0 but is equal to or smaller than 0.06. According to the twentieth aspect, it is possible to realize downsizing while keeping the distance (the maximum value L2max) from the point-of-view position (P200) for the virtual image (310) to the position where the virtual image (310) overlaps (the target position P410), and additionally reduce distortion of the virtual image (310).

While various embodiments have been described herein above, it is to be appreciated that various changes in form and detail may be made without departing from the spirit and scope of the present disclosure presently or hereafter claimed.

The entire contents of Japanese Patent Applications No. 2018-015926 and No. 2018-069723 mentioned above are incorporated by reference.

The invention claimed is:

1. A display system for displaying a virtual image overlapping with a target position in a target space, the system satisfying a condition where $|1/L1-1/L2max|$ is larger than 0 but is equal to or smaller than 0.06 wherein L1 [m] denotes a display distance defined as a distance from a point-of-view position for the virtual image to a display position of the virtual image, and L2max [m] denotes a maximum value of a target distance defined as a distance from the point-of-view position to the target position.

2. The display system according to claim 1, wherein $|1/L1-1/L2max|$ is equal to or smaller than 0.03.

3. The display system according to claim 1, wherein $|1/L1-1/L2max|$ is equal to or smaller than 0.02.

4. The display system according to claim 1, wherein $|1/L1-1/L2max|$ is equal to or smaller than 0.015.

5. The display system according to claim 1, wherein $|1/L1-1/L2max|$ is equal to or smaller than 0.01.

6. The display system according to claim 1, wherein L2max is 100 [m].

7. The display system according to claim 6, wherein L1 is in a range of 25 to 50 [m].

8. The display system according to claim 1, further comprising:
a display unit configured to display an image;
a projection unit configured to project the virtual image corresponding to the image into the target space; and
a control unit configured to control the display unit, wherein
the control unit is configured to change a display method for the image in accordance with a parameter determined based on the display position and the target position, and
the parameter is given by $|1/L1-1/L2|$, L2 [m] denoting the target distance.

9. The display system according to claim 8, wherein
the control unit is configured to change the display method for the image based on sensitivity to stereopsis when the parameter exceeds a threshold value.

10. The display system according to claim 9, wherein
the control unit is configured not to change the display method for the image while the parameter is equal to or smaller than the threshold value.

11. The display system according to claim 9, wherein
the threshold value defines a first threshold value, and
the control unit is configured to apply different display methods based on the sensitivity to stereopsis for a case in which the parameter exceeds the first threshold value but is equal to or smaller than a second threshold value larger than the first threshold value and a case in which the parameter exceeds the second threshold value.

12. The display system according to claim 11, wherein
the control unit is configured to, when the parameter exceeds the first threshold value but is equal to or smaller than the second threshold value, make change in the display method based on the sensitivity to stereopsis to decrease probability that a person looking at the target space from the point-of-view position feels something wrong in the virtual image and its vicinity.

13. The display system according to claim 11, wherein
the control unit is configured to, when the parameter exceeds the second threshold value, make change in the display method based on the sensitivity to stereopsis to increase probability that a person looking at the target space from the point-of-view position perceives that the virtual image is in the target position.

14. The display system according to claim 8, wherein
the change in the display method includes at least one of: change in luminance of the base image, change in resolution of the base image, change in contrast of the base image, change in chroma of the base image, change in texture density of the base image, emphasis of an angle of depression of the base image, emphasis of a perspective of the base image, and emphasis of change in size of the base image.

15. The display system according to claim 14, wherein
the control unit is configured to, when the display position is further from the point-of-view position than the target position is, perform at least one of increase in the luminance of the base image, increase in the resolution of the base image, increase in the contrast of the base image, increase in the chroma of the base image, decrease in the texture density of the base image, decrease in the angle of depression of the base image, and emphasis for increase in size of the base image.

16. The display system according to claim 14, wherein
the control unit is configured to, when the display position is closer to the point-of-view position than the target position is, perform at least one of decrease in the luminance of the base image, decrease in the resolution of the base image, decrease in the contrast of the base image, decrease in the chroma of the base image, increase in the texture density of the base image, increase in the angle of depression of the base image, and emphasis for decrease in size of the base image.

17. The display system according to claim 8, wherein
the control unit is configured to, when the display position is in upper part of a field of view of a user, draw parallel lines in perspective in the base image and change a degree of convergence of the parallel lines in a region which belongs to the base image and corresponds to the upper part.

18. The display system according to claim 8, wherein
the control unit is configured to, when the display position is in lower part of the field of view of a user, draw parallel lines in perspective in the base image and change a degree of divergence of the parallel lines in a region which belongs to the base image and corresponds to the lower part.

19. A movable object comprising:
a movable object body; and
the display system according to claim 1 mounted on the movable object body.

20. A design method for a display system for displaying a virtual image overlapping with a target position in a target space, the method comprising:

determining a display distance defined as a distance from a point-of-view position for the virtual image to a display position of the virtual image, and determining a maximum value of a target distance defined as a distance from the point-of-view position to the target position, wherein L1 [m] denoting the display distance and L2max [m] denoting the maximum value satisfy a condition where |1/L1−1/L2max| is larger than 0 but is equal to or smaller than 0.06.

* * * * *